(No Model.)  5 Sheets—Sheet 1.

C. N. DUTTON.
WATER CLOSET.

No. 280,017.  Patented June 26, 1883.

WITNESSES  
Wm A. Skinkle  
H. W. Elmore

INVENTOR  
Chauncey N. Dutton,  
By his Attorneys,  
Baldwin, Hopkins & Peyton.

(No Model.) 5 Sheets—Sheet 2.
C. N. DUTTON.
WATER CLOSET.
No. 280,017. Patented June 26, 1883.
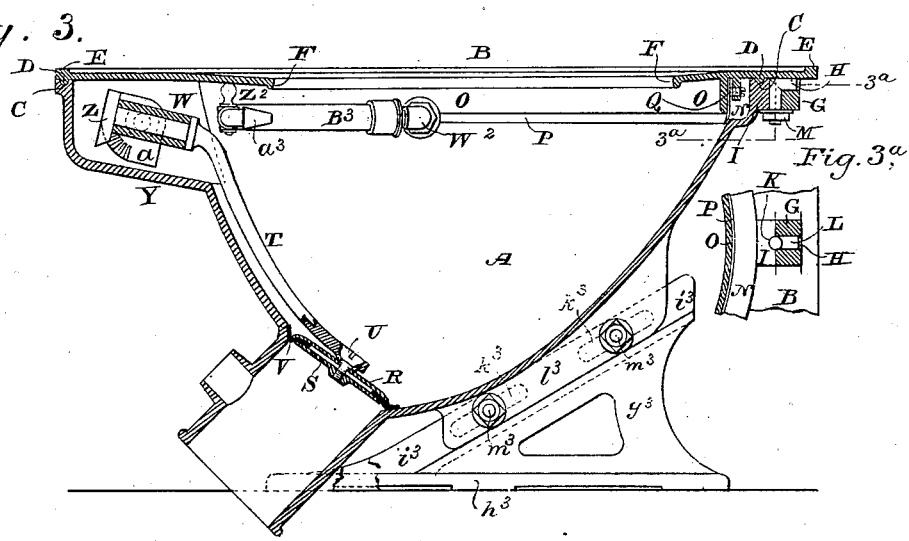
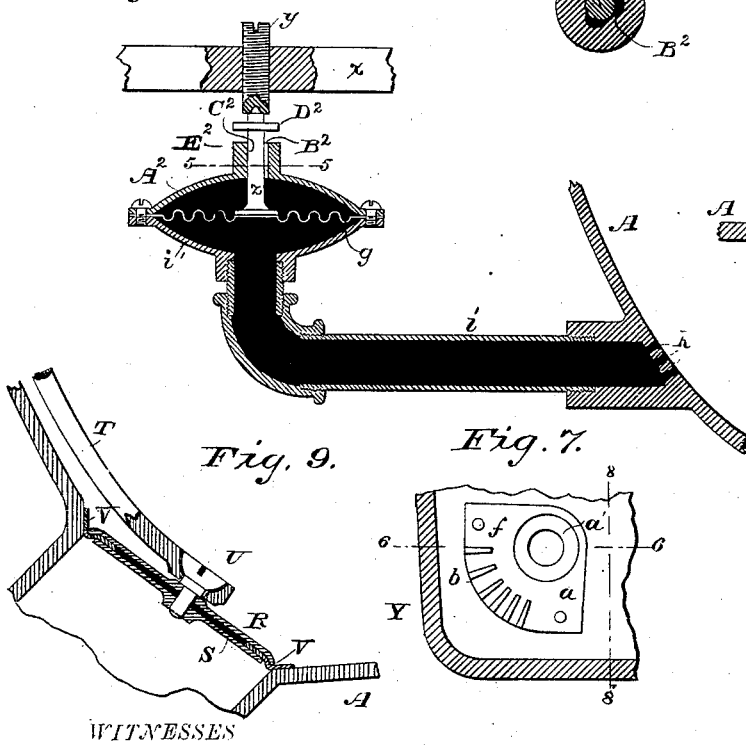
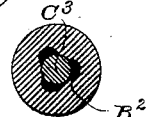
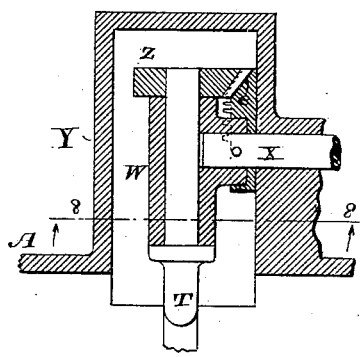
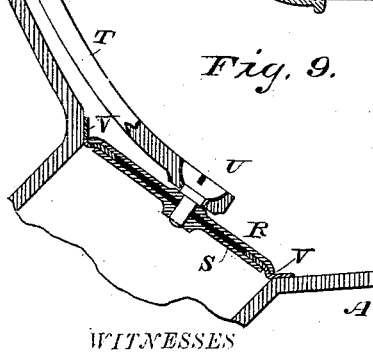
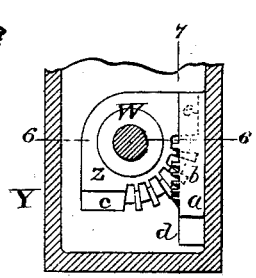
WITNESSES
Wm A. Skinkle
H. W. Elmore
INVENTOR
Chauncey N. Dutton
By his Attorneys
Baldwin, Hopkins & Peyton (No Model.)   5 Sheets—Sheet 3.

C. N. DUTTON.
WATER CLOSET.

No. 280,017.   Patented June 26, 1883.

WITNESSES
Wm. A. Skinkle
H. W. Elmore

INVENTOR
Chauncey N. Dutton
By his Attorneys
Baldwin, Hopkins, & Peyton

N. PETERS, Photo-Lithographer, Washington, D. C.

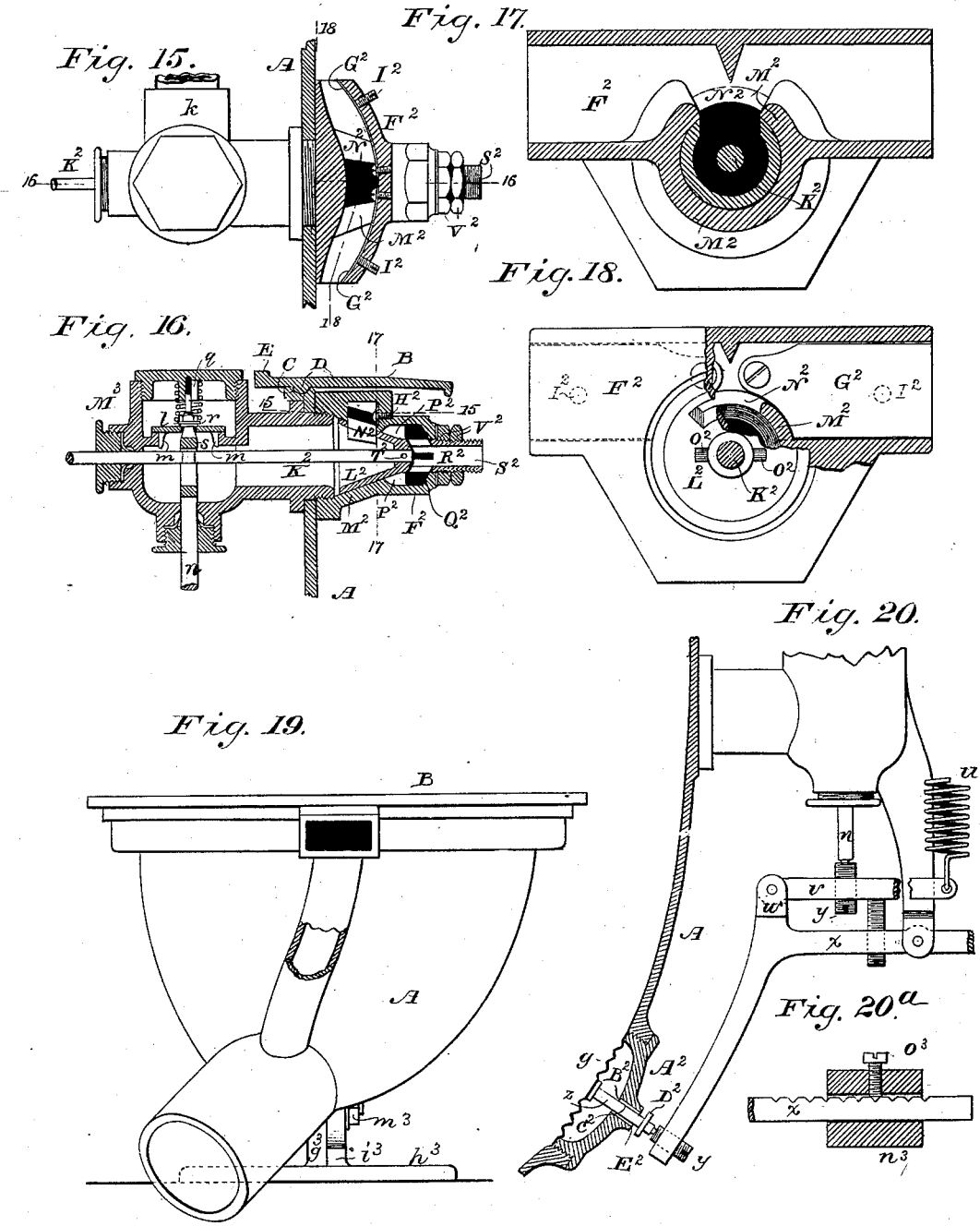

(No Model.)

C. N. DUTTON.
WATER CLOSET.

No. 280,017. Patented June 26, 1883.

WITNESSES
Wm A Skinkly
H. W. Elwood

INVENTOR
Chauncey N Dutton.
By his Attorneys
Baldwin, Hopkins & Peyton.

UNITED STATES PATENT OFFICE.

CHAUNCEY N. DUTTON, OF WASHINGTON, DISTRICT OF COLUMBIA, ASSIGNOR OF ONE-HALF TO THOMAS WILSON, OF SAME PLACE.

WATER-CLOSET.

SPECIFICATION forming part of Letters Patent No. 280,017, dated June 26, 1883.

Application filed October 20, 1881. (No model.)

*To all whom it may concern:*

Be it known that I, CHAUNCEY N. DUTTON, of Washington, District of Columbia, have invented certain new and useful Improvements in Water-Closets, of which the following is a specification, reference being had to the accompanying drawings, in which—

Figure 1:
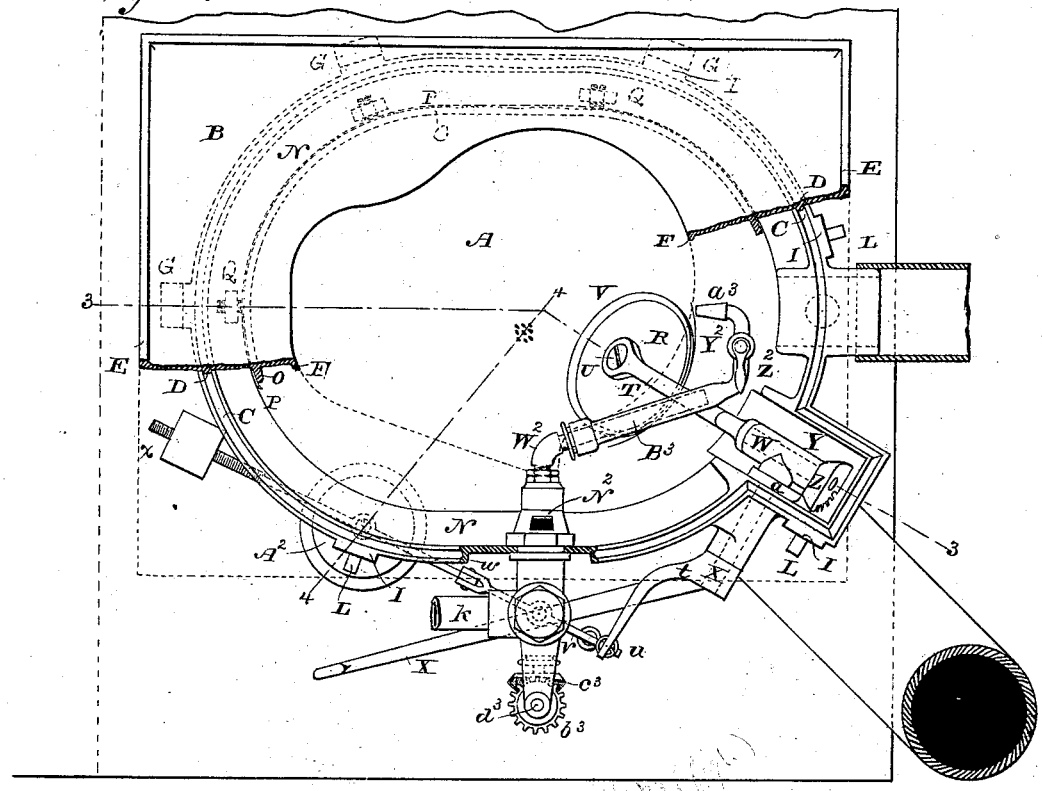
Figure 2:
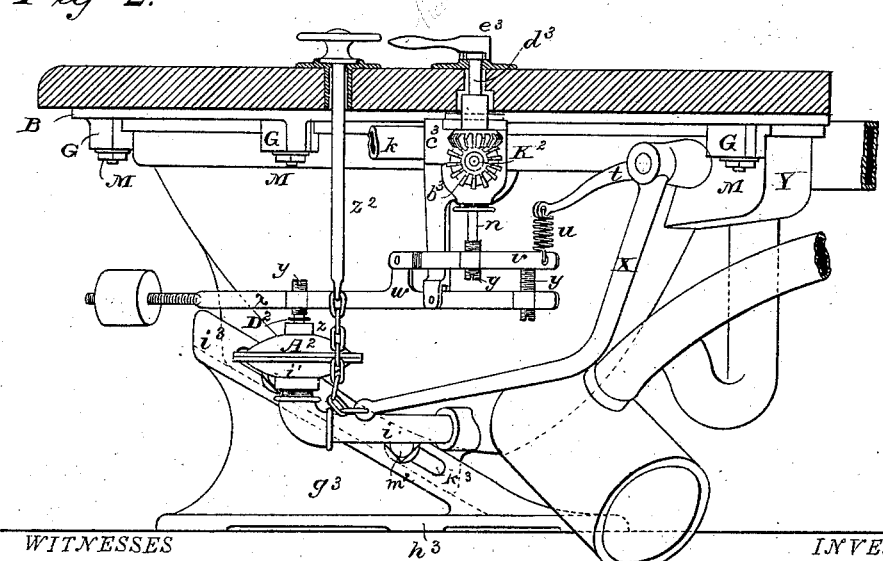
Figure 10:
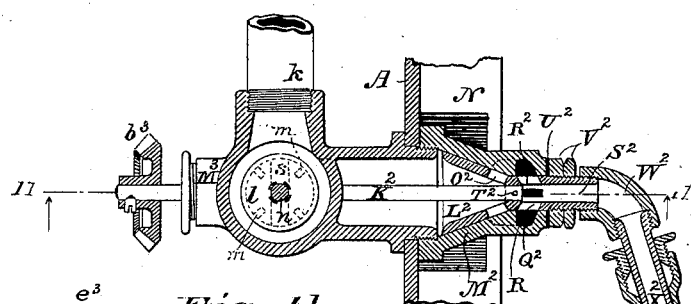
Figure 11:
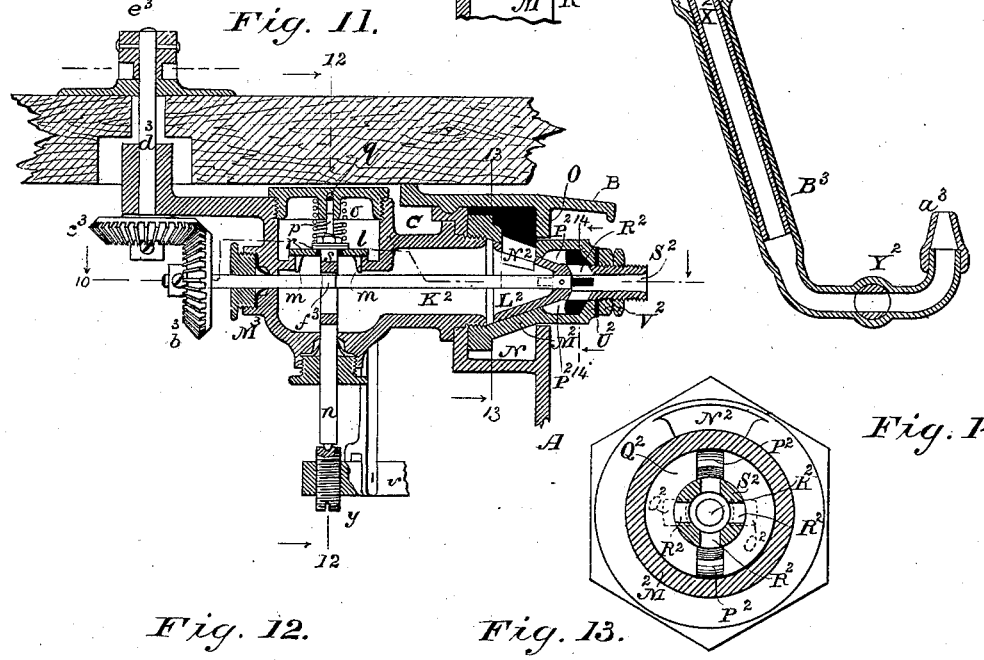
Figure 14:
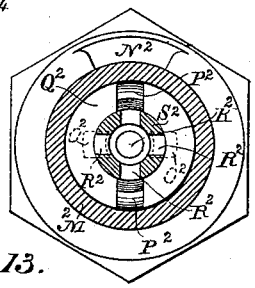
Figures 12, 13:
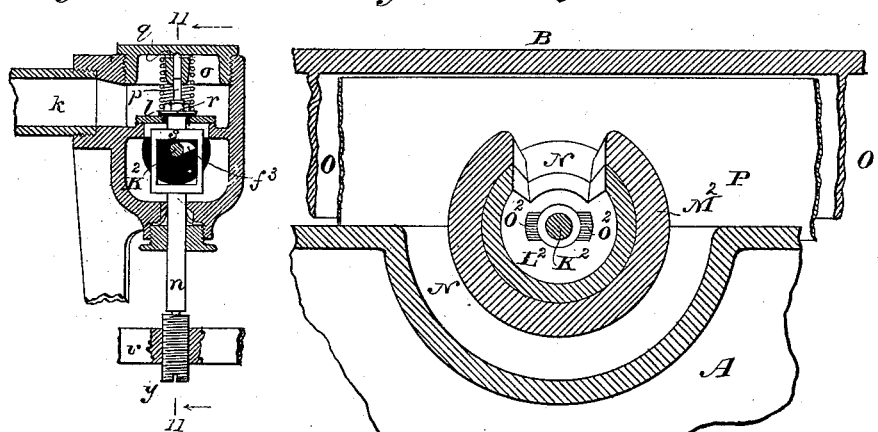
Figure 21:
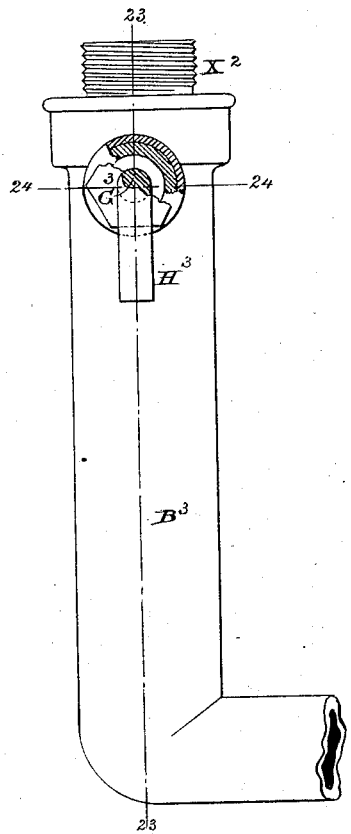
Figure 22:
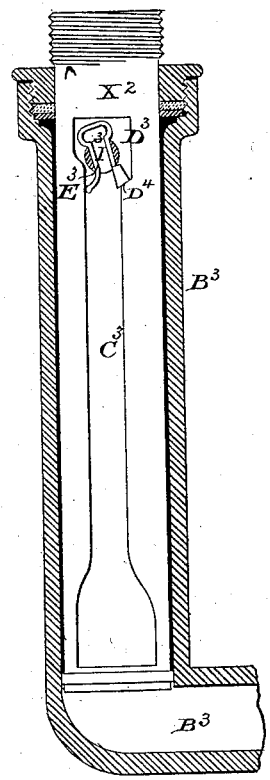
Figure 23:
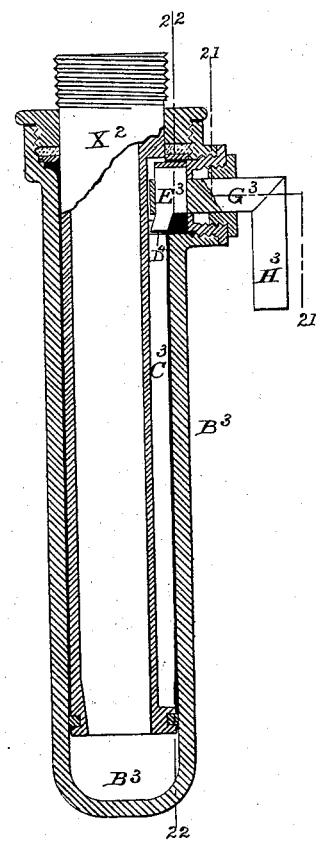
Figure 24:
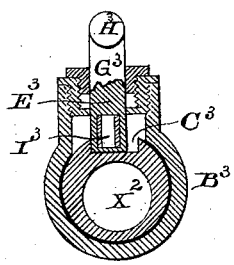
Figure 25:
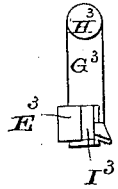
Figure 26:
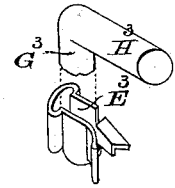

Figure 1 is a plan view of a water-closet embodying my improvements. Fig. 2 is a side elevation of the same, showing the wooden top or case in section. Fig. 3ª is a bottom plan view, partly in section, on the line 3ª of Fig. 3. Fig. 3 is a vertical section on the line 3 3 of Fig. 1. Fig. 4 is a section on the line 4 4 of Fig. 1. Fig. 5 is a section on the line 5 5 of Fig. 4. Fig. 6 is a horizontal section on the line 6 6 of Figs. 7 and 8. Fig. 7 is a view on the line 7 7 of Fig. 8. Fig. 8 is a view on the line 8 8 of Fig. 7. Fig. 9 is a central section through the lower portion of the hopper and outlet-valve. Fig. 10 is a horizontal section on the line 10 10 of Fig. 11. Fig. 11 is a vertical section on the line 11 11 of Figs. 10 and 12. Fig. 12 is a vertical section on the line 12 12 of Fig. 11. Fig. 13 is a section on the line 13 13 of Fig. 11. Fig. 14 is a vertical section on the line 14 14 of Fig. 11. Fig. 15 is a horizontal section on the line 15 15 of Fig. 16. Fig. 16 is a vertical section on the line 16 16 of Fig. 15. Fig. 17 is a vertical section on the line 17 17 of Fig. 16. Fig. 18 is a view, partly in section, on the line 18 18 of Fig. 15. Fig. 19 is a rear elevation of the hopper, showing the overflow and ventilating-aperture. Fig. 20 is a vertical section of one side of the hopper, showing a flexible diaphragm in the side of the hopper and lever-connections in elevation. Fig. 20ª is an elevation, partly in section, of one end of a diaphragm-lever and an adjustable weight. Fig. 21 is an elevation, partly in section, of a telescopic bidet-tube. Fig. 22 is a vertical longitudinal section of the same. Fig. 23 is a vertical longitudinal section on the line 23 23 of Fig. 21. Fig. 24 is a section on the line 24 24 of Fig. 21. Figs. 25 and 26 are detail views of detached parts of the bidet mechanism hereinafter described.

My invention consists of certain improvements upon that covered by my application for United States Patent for improvements in water-closets, filed July 19, 1880, and by the application for United States Patent for improvements in water-closets, filed by Thomas Wilson and myself, as joint inventors, July 19, 1880, which improvements are succinctly summed up in my appended claims.

Referring now to the letters upon the drawings for a detailed description of the construction and operation of my several improvements, A indicates the hopper, of substantially the same construction as set forth in the above-mentioned patents.

B indicates the cover of the hopper, preferably of rectangular shape, as shown in Fig. 1, so as to project well over the hopper and form a slop safe or sink, which is very useful in preventing water or foul matter from falling over outside of the hopper when vessels or utensils are being washed or when the closet is used as a urinal.

C indicates an annular groove which is cast or otherwise formed in the upper surface of the wall of the hopper, and D is a corresponding annular projection cast or otherwise formed upon the lower surface of the cover. This groove and projection, with the aid of putty, red lead, or other cementing or fastening substances, serve to secure the cover in place upon the hopper water-tight.

E indicates a flange projecting upward around the outer circumference of the cover. The upper surface of the cover within this flange inclines inward, as plainly indicated in Fig. 3, so that whatever substance may fall upon the cover will immediately find its way into the hopper.

F indicates a flange projecting downward around the inner margin of the cover, forming a drip which prevents any liquid matter passing around upon the under surface of the cover.

G indicates lugs upon the under side of the cover, provided with horizontal bolt-holes H, as shown in Figs. 3 and 3ª.

I indicates corresponding lugs upon the outside of the hopper, provided with bolt-slots K. When the cover is to be set in place, angular bolts L are inserted in the bolt-holes in the cover-lugs G, and the downwardly-projecting ends of these bolts then drop into the bolt-slots in the hopper-lugs I, as the cover is laid in place over the hopper. Nuts M are then applied, and the effect is, as will be observed from the drawings, to clamp the cover down tightly in its place over the hopper.

N indicates an annular water-recess formed around the upper inner part of the hopper.

O indicates a downwardly-projecting annular flange upon the under side of the cover, forming a front wall for the recess N, and nearly closing it.

P indicates a thin adjustable band or strip, of any suitable metal or other substance, secured upon the inner surface of the flange O by means of lugs and set-screws, as at Q. This band normally closes up the front side of the annular water-recess N; but when water is admitted to the recess under pressure it will force the lower margin of the band inward and escape between it and the bowl in a thin film, so as to perfectly wash the entire inner surface of the bowl. In some cases, where the flow of water is abundant, the adjustable strip may be dispensed with; but in general better results can be obtained by its use.

The outlet-valve is composed of two disks, R and S, secured upon the lower end of the valve-arm T by means of a screw, U, which causes the disks to clamp between them an annular rubber or other suitable yielding washer, V, as clearly shown in Figs. 3 and 9. The screw-head is convex upon its lower side, and fits into a corresponding concave socket or countersink in the valve-arm, whereby the valve may have a little play or tilting motion to seat it accurately, so that the pressure upon the washer may be uniform at all points. The disk R is of greater diameter than that of the disk S, and its margin is curved downward to strengthen it, and fit it to bear sharply under water-pressure upon the washer and so securely seat the valve. At the same time the projecting part of the washer bears by the water-pressure directly upon the mouth of the hopper-outlet, its flexible character accommodating any inequalities in the bearing-surface. It is desirable to have the valve, after being lifted from its seat to permit a flow of water from the bowl out into the waste-pipe, swing upward near to one side of the bowl, as contemplated in the patents above referred to. Accordingly I provide improved mechanism for accomplishing such a movement of the valve. In this mechanism the sleeve W upon the valve-lifting lever X forms a tilting bearing for the valve-arm. This sleeve and other valve-operating mechanism work in a pocket, Y projecting out from the hopper, thus taking the operating mechanism out of the way of refuse, and where it will not obstruct the flow of wash-water around the inside of the bowl. Upon the valve-arm within the pocket Y, I secure a segment of a beveled pinion, Z, gearing with a fixed segment of a beveled rack, $a$, secured to one of the walls of the pocket; but in place of these I might use a spur-pinion and straight rack or a link-connection. These segments have two of their teeth widely spaced, as at $b$. The pinion is provided with a projection or cheek, $c$, which, when the valve is seated, bears against the surface or cheek $d$ of the rack. The result of this construction is that when the valve is lifted by means of the valve-lifting lever the cheek of the pinion slides a short distance upon that of the rack until it comes in contact with the first cog of the latter, whereupon the pinion begins to revolve, and its teeth will properly engage with those of the rack, causing the partial revolution of the valve-arm. The segmental rack is provided with a circular aperture, $a'$, which fits the lifting-lever and forms part of its bearing. At the same times this aperture serves as a guide for setting the rack readily and with accuracy in its relation to the pinion, so that these parts will not bind. The valve-arm being angular, as shown in Fig. 3, its initial lifting without rotation will clear the valve from its seat, and its following rotation will then swing the valve upward close to the inside surface of the bowl.

In order to limit the upward throw of the valve, I provide a cheek or projection, $e$, upon the opposite side of the rotary segmental pinion, which acts as a stop by coming in contact with the cheek $f$ of the fixed segmental rack.

In Figs. 1, 2, and 4, I illustrate a flexible diaphragm, $g$, applied in connection with an air-cushion outside of the hopper, instead of in the wall of the hopper, as shown in Fig. 20, and as set forth in the patents above mentioned. The application of the diaphragm in connection with an air-cushion outside of the hopper has the advantage of always keeping the diaphragm dry; but with a diaphragm which water will not readily affect injuriously it will obviously be simpler and better to apply the diaphragm in the side of the bowl. When applied, however, as illustrated in Fig. 4, it will be perceived that the water from the hopper flowing through the apertures $h$ into the pipe $i$ will be obstructed by the air compressed within the pipe and space within the case $i'$ beneath the diaphragm, so that the column of air only will come in contact with the diaphragm and operate by pressure of the weight of water in the hopper to elevate it. As this mode of applying the diaphragm within a case, $i'$, outside of the hopper has the advantage of permitting the use of diaphragms of various substances that are economical, durable, and effective, yet unserviceable in immediate contact with water, I recommend it as an improvement accordingly.

In Figs. 10, 11, and 12 I illustrate valve mechanism for the purpose of supplying water to flush the hopper. In this valve mechanism $k$ indicates an inlet-pipe communicating with the interior of the valve-body above the valves. $l$ indicates a large valve seated so as to prevent the escape of water in the usual manner, and, when lifted, to permit the flow of water through the valve-body. This valve is provided with guides $m$, and with a valve-stem, $n$, for operating it by pushing upward. It is also provided with a spring, $o$, which tends to keep it seated, and a guide-pin, $p$, working in a socket or bearing, $q$. $r$ indicates a small auxiliary valve seated upon the top of the large valve and furnishing the lower bearing of the valve-spring. The large valve is loose upon the valve-stem, and the small valve is fixed thereon. A shoulder or stop, $s$, on the stem serves to lift the large valve after the small valve has been lifted, and when the stem is sufficiently elevated for the purpose. To operate this valve mechanism by hand I provide an arm, $t$, which may be a part of or connected to the outlet-valve-lifting lever. This arm is loosely connected by a coiled spring, $u$, with the lever $v$, pivoted to the lug $w$ upon a weighted regulating-lever, $x$. I prefer to employ set-screws $y\ y\ y$ for adjusting the diaphragm to the regulating-lever, the lever $v$ to the valve-stem, and the relation of the levers $v$ and $x$; but they might be dispensed with. Supposing these parts to be all adjusted and set for operation, when, by means of the pull-rod $z^2$, the outlet-valve-lifting lever is raised in the ordinary way, the effect will be to elevate the valve-stem and open both the water-inlet valves as well as the waste-valve. Then, as the pull-rod is released, the outlet-valve-lifting lever lowered, and the outlet-valve seated so as to close the waste-exit, the lever $x$ will have dropped by the force of its weight acting upon the diaphragm, causing the set-screw $y$, operating between it and the lever $v$, to hold up the free end of the lever $v$, thus holding up the valve-stem and keeping the valves open. As the water continues to flow into the hopper, when it rises to a certain height, nearly filling the hopper, its pressure upon the diaphragm will overcome the weight of the regulating-lever, elevating its weighted end and releasing its support of the free end of the lever $v$. The result will be that the lever $v$ and the valve-stem will descend, allowing the pressure of the water to close the large inlet-valve. The water will now continue to flow through the small inlet-valve only, because the diaphragm has been raised sufficiently to permit the closing of the large valve, but not sufficiently to permit the closing of the small one. As the hopper fills, the diaphragm is lifted still further, which permits the valve-stem to descend until the small valve is closed by the force of the valve-spring. The outlet-valve is designed to close the opening through the bottom of the hopper water-tight; but in case of any accidental leaking of the water out of the hopper, so as to reduce the pressure upon the diaphragm, the consequence will be that the diaphragm will be depressed by the weight upon the lever $x$ sufficiently to automatically open the small inlet-valve, which will admit a supply of water into the hopper that will raise the pressure upon the diaphragm to the point of again closing the small valve. Thus the hopper will always remain nearly filled with water.

In connection with the diaphragm, to form a protector to it, and also a guide for its stem $z$, I provide a cap, $A^2$, which may be secured outside the diaphragm in any suitable way, as clearly shown in Figs. 1 and 20. In order to permit free ingress and egress of air between this cap and the diaphragm, I provide one or more vent-holes, $B^2$, through the cap near to or connecting with the stem-opening $C^2$. I also provide upon the stem a shoulder, $D^2$, and a plain surface, $E^2$, upon the cap around the stem-opening, against which the shoulder may bear and fit accurately, so that in case of any accidental leakage through the diaphragm the weight upon the lever $x$ would instantly force the shoulder down upon its seat on the cap, close the vents, and thus automatically stop the leak.

I have described above a means of flushing the hopper which will be desirable in a more expensive class of closets; but for a cheaper class I have provided a flushing device or spreader as illustrated in Figs. 15, 16, 17, and 18. In these figures, $F^2$ indicates a metallic spreader applied in connection with the delivery end of the water-inlet pipe within the hopper, near its top. The openings to the right and left through this spreader are preferably of rectangular section, so that a flat stream will be delivered out horizontally on each side. $G^2$ indicates adjustable plates or vanes secured, by means of screws $H^2$, within the spreader, upon one side. By means of the set-screws $I^2$, I am enabled to adjust the vanes inward or outward, so as to expand or contract the delivery-apertures of the spreader to accommodate the water-pressure. By this means I may also make the flow of water upon one side greater or less than upon the other, as desired.

In connection with my inlet-valve and flushing or spreading devices I employ a bidet mechanism so contrived that it may be applied to either form of my flushing mechanism without at all interfering with the flushing operation, and so as to operate, whenever desired, independent of the flushing mechanism and of the pull-rod.

$K^2$ indicates a small shaft extending through the valve-body, and provided with a rotary cone-valve, $L^2$, seated upon a conical seat, $M^2$. This shaft is provided with a packing-box, $M^3$, and passes through a central longitudinal slot or yoke in the valve-stem. The cone-valve and its seat are each provided with three ports, and the construction and arrangement of these ports are, as usual in valves of this kind, such that when the cone-bearing is revolved to the proper positions these ports may be all closed; or the large port alone may be opened; or the large port may be closed and both the small ports may be opened. The large port $N^2$, which, when the bidet is not in use, is always open to permit a flow of water into the flushing or spreading mechanism, is always closed when the bidet is being used or is in position for use. The small ports $O^2$ are only open when the large port is closed and the bidet in position to be used. Then they direct the passage of water into the ways $P^2$, whence it passes into the annular chamber $Q^2$, and thence through the ports $R^2$ in the pipe $S^2$. This pipe is a continuation of the cone-valve, and always rotates with it by means of the shaft $K^2$, which is secured firmly to the cone and its continuation at the point $T^2$. The cone-bearing may be secured to the valve-body by means of screw-threads, as at the point $U^2$.

In order to secure a water-tight joint between the cone-valve and its seat, I provide a screw-thread upon the outer end of the pipe $S^2$, upon which I apply ordinary locking-nuts, $V^2$, which serve to draw the cone into its seat.

Upon the end of the pipe $S^2$, I firmly secure an elbow or curved section, $W^2$, which is joined to the bidet-pipe, $X^2$; or I secure the bidet-pipe to the pipe $S^2$ at a proper angle in any other suitable manner. For convenience, when the bidet is turned up to a vertical position for use, in which position the water will discharge downward into the hopper, and will serve to continually wash vessels, &c., I provide a telescopic joint or section of the bidet-pipe in the ordinary way, as clearly shown in Fig. 10, which enables me to elongate the bidet-tube at pleasure. I also provide a spigot, $Y^2$, near the nozzle of the bidet, by means of which the flow of water can be cut off at will. The handle $Z^2$ of this spigot I apply with ordinary stops, so that it will turn only one way to close, and back to open. When it is turned into the position shown in Fig. 1, the water will flow out of the bidet; but when turned at right angles to that position the water will be cut off. In the latter position the handle will project, so that in case it is attempted to return the bidet to its first position, as in Fig. 1, without restoring the handle to its first position, the handle will impinge against the front side of the cover. Thus the bidet discharge-tube is always kept open, as it should be, for convenience, except when there is a special reason for closing it. I provide a flexible nozzle, $a^3$, in order that the stream from the bidet may be readily directed, as desired.

Upon the outer end of the shaft $K^2$ is a beveled pinion, $b^3$, which gears with a corresponding beveled pinion, $c^3$, upon a vertical shaft, $d^3$, provided with suitable bearings and a handle, $e^3$. These appliances are for the purpose of operating the cone-valve and bidet through the instrumentality of the shaft $K^2$.

From the foregoing description of the construction and relation of the parts it will be perceived that when the handle $e^3$ is turned, the cone-valve and the entire bidet mechanism will be rotated.

Upon the shaft $K^2$, and within the yoke of the valve-stem, is provided a small cam, $f^3$, so placed as to raise the valve-stem and open the valves whenever the bidet-handle is turned a three-quarters revolution, bringing the bidet to the elevated position. It is only in such a case that the operation of the bidet-handle will raise the inlet-valves and cause a flow of water through the bidet alone. A quarter-revolution of the handle will simply bring the bidet to the depressed position within the hopper, open the small ports, and close the large port of the cone-valve, but will not open the inlet-valves and cause a flow of water. When the bidet is in that depressed position, the operation of the pull-rod will cause a flow of water through the bidet only. While the handle is being turned to bring the bidet to the elevated and to the depressed positions, all the ports of the cone-valve will be closed, and no flow of water will take place.

As illustrated in Figs. 21 to 26, inclusive, I provide an improved telescopic section for a bidet, in order to guard against the extension of the bidet by water-pressure or gravity, in constructing which I form in the inner tube, $X^2$, a stop and guide-channel, $C^3$. At the end of the channel nearest the inlet-valve I provide a recess, $D^3$, in which is a stop, $E^3$, and the other end is enlarged. The tube $X^2$ has a piston-head on its inner end, its outer end being suitably attached to the pipe $S^2$ and the valve $L^2$. A key-rod, $G^3$, passing through a suitable stuffing-box in the side of the outer tube, $B^3$, is provided on its outer end with a suitable handle, $H^3$, for partially rotating it. The rod $G^3$ has a slot, $I^3$, near its inner end, and carries the stop $E^3$. This stop is formed of a flat piece of metal bent into a loop and passed through the slot $I^3$, with the ends projecting. One of these ends is bent back so as to bear against that side of the channel opposite the recess, and by its force keep the other end engaged with the shoulder $D^4$ when not released by hand. That end which engages the shoulder is bent downward and backward, as shown in the drawings, to present a square end for engagement with the shoulder $D^4$, and also to prevent the loop from being pushed backward through the slot $I^3$.

In practice, when it is desirable to extend the bidet by means of the lever, the stop is borne back so as to escape the shoulder, allowing the telescopic section to be drawn out until the stop comes in contact with the termination of the channel. This stop prevents the tubes from being drawn asunder, and also from rotating except when the stop is in the enlarged part of the channel, when it permits a partial rotation in order to direct the flow of water as desired.

For the purpose of securely seating and readily adjusting the hopper and the mechanism it carries into place, I provide a shoe or bracket, $g^3$, having a flat footing, $h^3$, and an inclined flange and shoulder, $i^3$. Extending through this flange are two or more longitudinal slots $k^3$. Upon the hopper I apply or form an inclined projection or keel, $l^3$. In putting in the closet, the hopper is first set and leveled according to the pipe-connections, the bracket being adjusted into place, one side of its flange bearing against one side of the hopper-keel. Bolts and nuts $m^3$ are then applied to secure the keel and hopper together, as shown in Fig. 3, thus affording a very readily adjustable and reliable support for the hopper.

In Fig. 21 is shown a section of lever $x$, notched like a steelyard-arm, and a movable weight, $n^3$, for the lever, provided with a set-screw, $o^3$. This set-screw can be turned up when the weight is to be adjusted, and then turned down to set the weight in place, the end of the screw entering one of the lever-notches.

Although I have above described some peculiar valve mechanism, I do not claim it in this patent, having reserved it for claim in a patent I intend hereafter to apply for.

Having thus described my improvements, what I claim as of my invention, and desire to secure by Letters Patent, is—

1. A water-closet hopper having combined with it an outlet-valve working upward within the hopper, and a pocket, Y, projecting from one side, near the hopper top, for containing valve-arm-operating mechanism, substantially as set forth.

2. The combination of the annular-grooved hopper, the cover having the annular projection, the cover-lugs having horizontal bolt-holes, and the hopper-lugs having bolt-slots and the angular bolts and their nuts, substantially as and for the purpose set forth.

3. The combination of the hopper having the annular water-recess, the cover having the annular flange O, and the adjustable strip P, substantially as and for the purpose set forth.

4. The combination of the pivoted valve-lifting lever X, and the sleeve W, secured thereto and forming a tilting bearing for the swinging valve-arm T, substantially as and for the purpose set forth.

5. The combination of the valve-lifting lever provided with the sleeve W, the valve-arm T, and the segmental pinions, substantially as and for the purpose set forth.

6. The segmental rack $a$, provided with the valve-lifting-lever bearing or guide-aperture $a'$, the cheeks $d$ and $f$, and the teeth, two of which are widely spaced, as and for the purpose set forth.

7. The segmental pinion provided with the cheeks $c$ and $e$ and the teeth, two of which are widely spaced, as and for the purpose set forth.

8. The combination of the valve-arm having a countersink, the screw U, serving as a pivot to tilt the valve, the two disks R and S, and the annular washer V, substantially as and for the purpose set forth.

9. The combination of the washer with the disks R and S, the former of the greater diameter and curved downward at its margin, as and for the purpose set forth.

10. The combination of the diaphragm and its stem with the levers $v$ and $x$ and the valve-stem, substantially as and for the purpose set forth.

11. The combination of the diaphragm and its stem with the levers $v$ and $x$, the set-screws $y\,y\,y$, and the valve-stem, substantially as and for the purpose set forth.

12. The combination, with the hopper, of the water-pipe $i$, case $i'$, and diaphragm, substantially as and for the purpose set forth.

13. The combination of the valve-lifting lever, the arm $t$, the coiled spring $u$, the levers $x$ and $v$, and the valve-stem, substantially as and for the purpose set forth.

14. The combination of the valve-lifting lever, the arm $t$, the coiled spring $u$, the levers $x$ and $v$, the set-screws $y\,y\,y$, and the valve-stem, substantially as and for the purpose set forth.

15. The combination of the spreader $F^2$, the adjustable plates or vanes $G^2$, and the set-screws $I^2$, within the spreader and upon one side, substantially as and for the purpose set forth.

16. The combination, in a water-closet, of the water-inlet mechanism, and bidet mechanism provided with gearing and a handle, whereby the bidet may be turned into the position of rest, or into either the elevated or depressed position for use, and the water-inlet at the same time controlled, substantially as and for the purpose set forth.

17. The combination of the telescopic bidet-pipes, the inner one provided with the channel $C^3$ and recess $D^3$, the key-rod $G^3$, and a stop, substantially as and for the purpose set forth.

18. The combination, with a water-closet, of a bidet discharge-pipe, and a spigot the handle of which is so arranged that when turned to prevent a flow of water it projects so as to strike the cover, substantially as and for the purpose set forth.

19. A water-closet hopper provided with an inclined keel, $l^3$, substantially as and for the purpose set forth.

20. A water-closet hopper provided with an inclined keel, $l^3$, in combination with a shoe or bracket having an inclined flange and shoulder $i^3$, and longitudinal slots for fastening-bolts, substantially as and for the purpose set forth.

In testimony whereof I have hereunto subscribed my name this 12th day of October, A. D. 1881.

CHAUNCEY N. DUTTON.

Witnesses:
MARCUS S. HOPKINS,
L. B. WIGHT.